June 21, 1960 F. A. McNALLY 2,941,443
SPECTROMETER AND MEANS FOR SHIFTING ITS SPECTRAL
RADIATIONS RELATIVE TO THE FOCAL PLANE
Filed Feb. 28, 1955 3 Sheets-Sheet 1
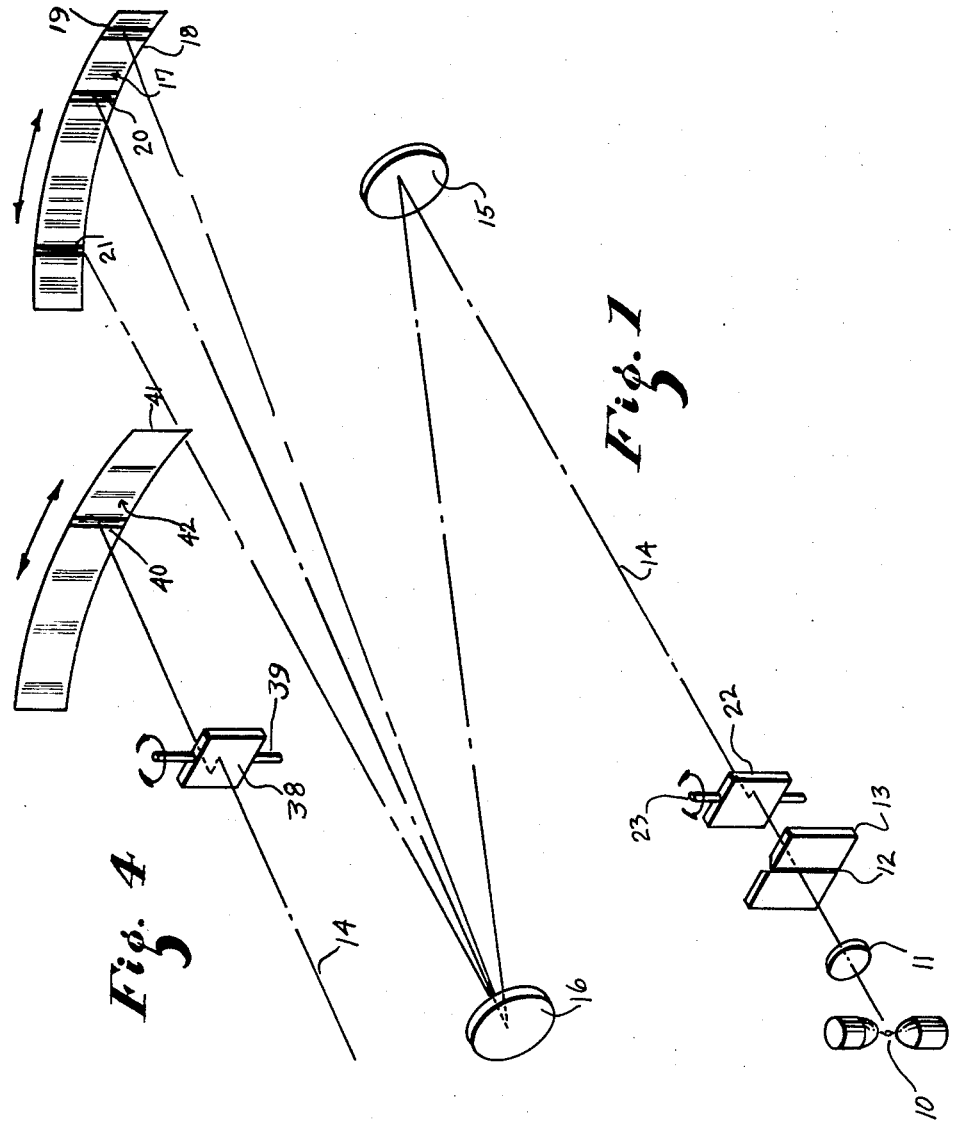
INVENTOR.
Frederick A. McNally
BY
Attorney

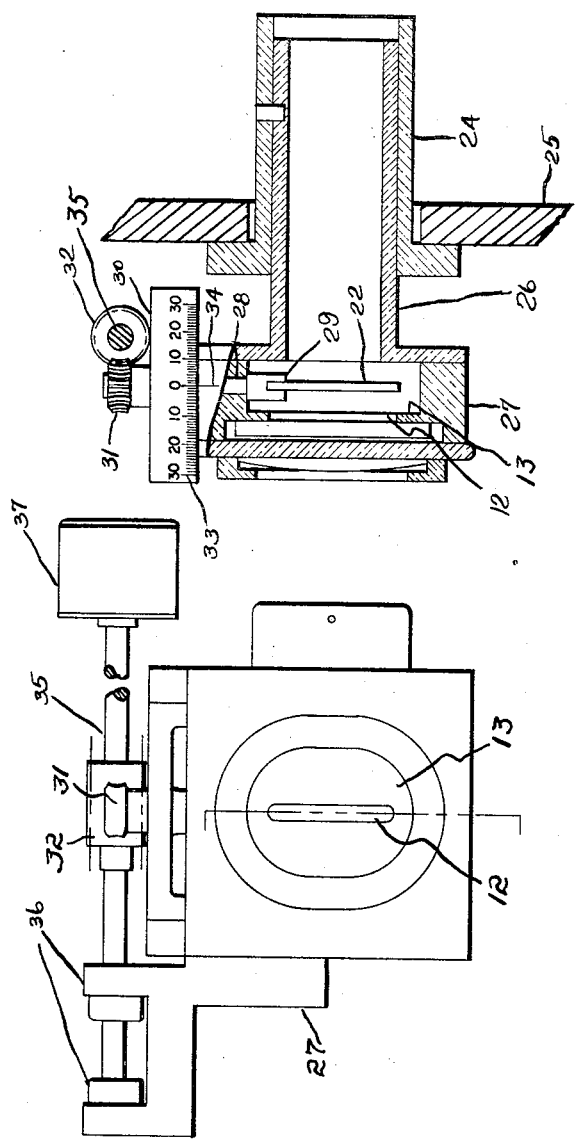

June 21, 1960  F. A. McNALLY  2,941,443
SPECTROMETER AND MEANS FOR SHIFTING ITS SPECTRAL
RADIATIONS RELATIVE TO THE FOCAL PLANE
Filed Feb. 28, 1955  3 Sheets-Sheet 3

INVENTOR.
Frederick A. McNally
BY

United States Patent Office 2,941,443
Patented June 21, 1960

2,941,443

SPECTROMETER AND MEANS FOR SHIFTING ITS SPECTRAL RADIATIONS RELATIVE TO THE FOCAL PLANE

Frederick A. McNally, Dedham, Mass., assignor to Jarrell-Ash Company, Newtonville, Mass., a corporation of Massachusetts Filed Feb. 28, 1955, Ser. No. 491,027

1 Claim. (Cl. 88—14)

This invention relates to spectrometers and particularly to adjusting means for bringing at least one selected wave length into predetermined position relative to the focal plane of the instrument.

In a spectrometer, a light channel through a slit includes a dispersing element by which spectral radiations are brought to a focus on a focal plane member provided with a plurality of spaced slits, one for each wave length that is to be utilized. Precise adjustments are necessary to bring each selected wave length into registry with its slit and these adjustments may be disturbed for a variety of reasons including pressure and temperature changes, mechanical strains and shifts due to vibrations.

The difficulty of initially effecting such adjustments and of reestablishing them has been recognized. One proposal for enabling such adjustments to be made was to provide a focal plane member having mounts provided with slits and shiftable in one direction or the other along the focal plane so that each slit could be adjusted to receive the spectral frequency for which it was intended. Another proposal employed a right angle prism between the channel forming slit and the dispersing element, said prism being rotatable about an axis parallel to that slit. Both arrangements, while making accurate adjustments and readjustments possible, are subject to the objections that in order to operate them relatively expensive micrometer-like mechanisms were required.

The present invention has, as its principal objective, the provision of means enabling the spectral radiation or radiations to be shifted in one direction or the other relative to the focal plane of the instrument quickly, easily, and accurately by mechanisms that are rugged, inexpensive and compact. This objective is attained by providing in a spectrometer, a first member having a slit to receive light from a light source and to provide a channel directed to a dispersing element. Radiations from the dispersing element are distributed along a second member in the focal plane and having a plurality of slits. A rotatable refractive plate having its axis parallel to the slits is located between one of those members and the dispersing element. Such a refractive plate may be located either in back of the first member or in front of the second member, or in both locations. There may be a plurality of such plates for the second member, one for each of its slits.

In the accompanying drawings, there are shown illustrative embodiments of the invention from which its novel features and advantages and other of its objectives will be readily apparent.

In the drawings:

Fig. 1 is a schematic view of a spectrometer in accordance with the invention in which the refractive plate is located between the first member and the dispersing element.

Fig. 2 is a front view, on an enlarged scale, of the first member and the associated refractive plate.

Fig. 3 is a partly sectioned side view of the mechanism shown in Fig. 2.

Figure 5:
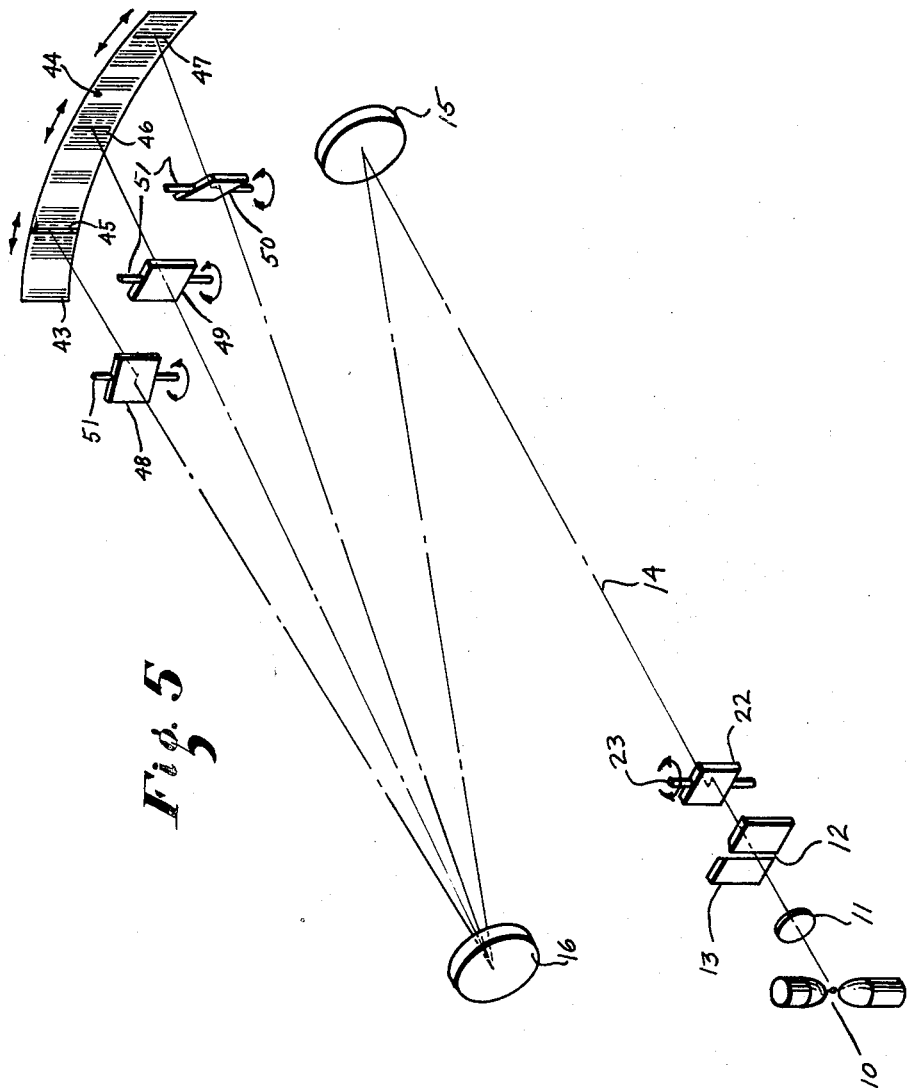

Fig. 4 is a fragmentary schematic view of a modification of the invention in which the refractive plate is located proximate to the focal plane member, and Fig. 5 is a schematic view of a further modification of the invention in which a single refractive plate is associated with the first member and a plurality of like plates are associated with at least certain ones of the slits in the second member.

As illustrative of a spectrometer in accordance with the invention, reference is made to Fig. 1 wherein a suitable light source is indicated at 10 with the usual collimating lens 11 disposed between it and the slit 12 provided by the first member 13. The slit 12 directs a channel of light 14 to the mirror 15 employed to collimate and reflect the channel 14 to the dispersing element 16. The function of the dispersing element 16 is to provide spectral radiations, indicated generally at 17, in the focal curve provided by the second member 18. The member 18 is shown as having a plurality of accurately spaced slits, for example, the slits 19, 20, and 21, each for a spectral radiation that is to be studied.

In order to ensure that a selected wave length registers with the appropriate one of the slits in the second member 18, there is shown a rotatable refractive plate 22, conveniently a quartz crystal, located behind the first member 13 and having its axis of rotation, suggested at 23, in parallel with the slit 12. Rotation of the plate 22 in one direction or the other causes corresponding movement of the spectral radiations relative to the slits of the second member. The amount of shift per degree of rotation is dependent on the thickness of the plate and its dispersive characteristics. In practise, the actual adjustment may be accomplished either by visually observing one of the spectral lines within a single exit slit or by passing the light through one of the exit slits onto a photosensitive device and observing the signal on an oscilloscope.

In Figs. 2 and 3, a satisfactory member and plate arrangement is detailed. A mount 24 fixed in the instrument wall 25 supports the focus tube 26 of the body 27. The body 27 includes the first member 13 having the slit 12 and it also rotatably supports a stem 28 located in back of the member 13. The stem 28 has a forked end 29 to which is attached the quartz plate 22 and it also carries a quadrant member 30 and a worm gear 31, the latter meshing with the worm 32 and the former having a series of graduations 33 readable with reference to the marker 34.

The worm 32 is fast on the shaft 35 suitably journalled at one end in spaced supports 36 with which the body 27 is provided. At its other end, the shaft 35 is provided with an adjusting knob 37.

While other mechanisms may be employed to rotate the refractive plate 22, that detailed is illustrative and shows that it is contemplated that the plate may be turned through as much as 90°. In practice, each degree is the equivalent of several, say 4–10 microns, depending on the thickness and character of the plate so that accurate settings may be quickly attained.

In Fig. 4, there is shown a refractive plate 38 having its axis of rotation 39 parallel with the slit 40 in the second member 41 disposed to provide the focal plane 42 of the spectral images radiating from the dispersing element of the spectrometer. It will be apparent that radiations of the wave length which the slit 40 was established to receive may be shifted into registry therewith by rotatably adjusting the plate 38.

The embodiment of the invention illustrated by Fig. 5 employs a second member 43 disposed to provide the focal plane of the instrument to receive spectral images, generally indicated at 44, radiating from the dispersing element 16. The member 43 is shown as having three slits 45, 46 and 47, each for a spectral frequency of a different wave length. Between the slits 45, 46 and 47 and the dispersing element 16, there are shown refractive plates 48, 49, and 50, respectively. These have their axes of rotation 51 parallel to the slits and are disposed so that the radiations intended for each slit may be accurately directed thereto.

From the foregoing, it will be apparent that the invention provides satisfactory bases for effecting easily, quickly, and accurately the proper registration of one or more selected spectral frequencies with the appropriate slit or slits. While the invention is illustrated with respect to a Wadsworth type of spectrometer, it is obvious that it is equally well adapted for use in any other type of spectrometer.

What I therefore claim and desire to secure by Letters Patent is:

In a spectrometer, a first member having a slit to receive light from a light source and to provide a light channel, a dispersing element disposed in said channel, a second member disposed in the focal plane of radiations from said element and having a plurality of slits in parallel with the slit of the first member, each for a selected wave length, and adjustable means adapted to shift spectral radiations to bring at least one of them into registry with the appropriate one of said second member slits, said means comprising a refractive plate, a body for one of said members in which said plate is rotatably mounted on the side thereof that is proximate to said element, and with its axis of rotation parallel to said slits, said body also supporting a worm gear and a quadrant rotatably connected to said plate, a worm meshing with said worm gear, and a shaft for said worm rotatably supported by said body.

References Cited in the file of this patent
UNITED STATES PATENTS

| | | |
|---|---|---|
| 1,682,572 | Keuffel | Aug. 28, 1928 |
| 2,675,734 | Hasler et al. | Apr. 20, 1954 |

FOREIGN PATENTS

| | | |
|---|---|---|
| 10,200 | Great Britain | of 1911 |